(12) United States Patent
Bosch et al.

(10) Patent No.: US 6,552,098 B1
(45) Date of Patent: Apr. 22, 2003

(54) OPEN-CELLED SEMI-RIGID FOAMS WITH EXFOLIATING GRAPHITE

(75) Inventors: Ronald Van Den Bosch, St Jansteen (NL); Hans A. G. De Vos, Terneuzen (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/890,586

(22) PCT Filed: Feb. 2, 2000

(86) PCT No.: PCT/US00/02702

§ 371 (c)(1),
(2), (4) Date: Oct. 12, 2001

(87) PCT Pub. No.: WO00/46283

PCT Pub. Date: Aug. 10, 2000

Related U.S. Application Data

(60) Provisional application No. 60/118,280, filed on Feb. 2, 1999.

(51) Int. Cl.[7] .................................................. C08G 18/08
(52) U.S. Cl. .......................... 521/170; 521/99; 521/174
(58) Field of Search ........................ 521/99, 170, 174

(56) References Cited

U.S. PATENT DOCUMENTS

| | | | |
|---|---|---|---|
| 4,698,369 A | 10/1987 | Bell | 521/99 |
| 4,722,945 A | 2/1988 | Wood et al. | 521/65 |
| 4,970,243 A | 11/1990 | Jacobs et al. | 521/155 |
| 4,977,194 A | 12/1990 | Haas et al. | 521/99 |
| 5,023,380 A | 6/1991 | Babb et al. | 568/34 |
| 5,198,483 A * | 3/1993 | Gainer | 521/108 |
| 5,654,344 A * | 8/1997 | Falke et al. | 521/172 |
| 5,721,281 A | 2/1998 | Blount | 521/50 |
| 6,084,008 A * | 7/2000 | Liu | 521/107 |

FOREIGN PATENT DOCUMENTS

| | | |
|---|---|---|
| EP | 0464204 | 1/1992 |
| GB | 2226033 | 6/1990 |

* cited by examiner

Primary Examiner—John M. Cooney, Jr.

(57) ABSTRACT

A method for producing an open cell low-density semi-rigid polyurethane foam suitable for general use as a thermal insulating material and/or an acoustical applications is disclosed. The method comprises a method for producing a flame-retardant open-celled semi-rigid polyurethane foam having an overall density of 5 to 30 kg/m$^2$ by reacting (a) a polyisocyanate and (b) a polyol having a molecular weight of 100 to 10,000, in the presence of (c) an effective amount of an exfoliating graphite, (d) blowing agent and (e) optional additional auxiliary substances to produce.

14 Claims, No Drawings

OPEN-CELLED SEMI-RIGID FOAMS WITH EXFOLIATING GRAPHITE

This application claims the benefit of 60/118,280, filed Feb. 2, 1999.

This invention relates to a method of producing an open cell semi-rigid low density polyurethane foam having improved flame retardant properties.

The physical and mechanical properties of polyurethane foams make them suitable for a wide variety of applications, such as thermal insulation, packaging, upholstery, carpet underlay, automobile dashboards or structural material. An important consideration when employing polyurethane or other polymeric foams is the ability of such foams to resist ignition, or once ignited, to be self-extinguishing when the ignition heat source is removed. This is particularly important when the foam is to be used within a confined space.

The most common method to decrease the flammability of polyurethane foams is to incorporate a halogenated compound or a phosphate ester flame retarding agent into the foam formulation. While such compounds provide some improvement in the flame retardation properties, relatively large quantities of these agents must be used in order to obtain satisfactory results, adding significantly to the cost of the foam. In addition, under fire conditions they can decompose to gaseous halogen-containing compounds such as HCl or HBr.

Other types of flame retardant additives which have been proposed include the incorporation of a large amount of nitrogenous substances into the foam. U.S. Pat. No. 4,221,875 describes rigid polyurethane foams which include melamine powder in an amount of between 20 and 100 parts by weight based on the weight of the polyhydroxyl compound. While melamine is effective in producing foams which are flame retardant, melamine has some adverse affects on foam physical properties, as well as producing a heavy foam product.

The use of graphite or combinations of graphite and melamine have also been proposed, see for example U.S. Pat. Nos. 4,698,369, 5,023,280, 5,173,515, and 5,192,811.

Despite the abundance of disclosed processes to obtain flame retardant foams, there continues to be a need to improve the fire retardant properties of foams. Particularly to produce foams in an economical manner which are free of volatile flame retardants and meets or exceeds the standard flame retardation tests.

It is an object of the present invention to provide a method for producing an open cell low-density semi-rigid polyurethane foam suitable for general use as a thermal insulating material and/or use in acoustical applications. It is also an object of the invention to produce foams which have enhanced flame retardation properties over conventional semi-rigid foams. It is another object of the invention to produce-flame retardant foams in the absence of a volatile flame retardant agent.

According to the invention, there is provided a method for producing a flame-retardant open-celled semi-rigid polyurethane foam having an overall density of 5 to 30 kg/m$^3$ by reacting (a) a polyisocyanate and (b) a polyol having an average molecular weight of 100 to 10,000 and average functionality of 2 to 6, in the presence of (c) an effective amount of an exfoliating graphite, (d) blowing agent and (e) optional additional auxiliary substances.

In another aspect the invention is to the use of water as the substantially sole blowing agent in preparing such foams.

Further according to the invention, there is a semi-rigid low-density open-celled foam produced by the process described above.

It has been surprisingly found that the use of exfoliating graphite as the sole flame retardant agent in the production of a semi-flexible foam allows the production of a low-density foam which has enhanced flame retardation properties, as measured by the German norm DIN-4102 Teil 1, Mai 1998, baustoffklasse B2 in Germany (B2 test). This is particularly unexpected as when decreasing the density of a foam, it is generally more difficult to meet the flame retardation properties as measured by standard tests. It was also unexpected that foams containing exfoliating graphite could be produced which contained sufficient graphite to give sufficient flame retardation properties to the foam to pass the B2 test and have the low density disclosed herein.

The term semi-rigid as applied to foams is a standard term used in the art. Generally such foams have a glass transition temperature (Tg) between rigid and flexible foams. A low-density foam means the foam has a density of 5 to 30 kg/m$^3$, preferably 10 to 20 kg/m$^3$ and more preferably a density of 10 to 15 kg/m$^3$. Open-celled foam means that 50 percent or more of the cells in the foam have an open structure. Preferably, for use in acoustic applications, the foams have greater than 90 percent open cells.

Exfoliating graphite is graphite containing one or more exfoliating agents such that considerable expansion occurs upon exposure to heat. Exfoliating graphite is prepared by procedures known in the art. Generally graphite is first modified with oxidants, such as nitrates, chromates, peroxides, or by electrolysis to open the crystal layer and then nitrates or sulfates are intercalated within the graphite.

The amount of exfoliating graphite used in the foams to give the desired physical properties is generally less than 20 percent by weight of the foam. Preferably the amount of graphite is 15 percent or less by weight of the foam. More preferred is the use of 10 percent or less by weight of graphite in the foam. To meet the B2 test, the foams generally contain 2 percent by weight or greater of graphite in the final foam. Preferably the amount of graphite is 4 percent or greater by weight of the foam.

Polyisocyanates useful in making polyurethanes include aliphatic and cycloaliphatic and preferably aromatic polyisocyanates or combinations thereof, advantageously having an average of from 2 to 3.5, and preferably from 2 to 3.2 isocyanate groups per molecule. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. The preferred polyisocyanates are aromatic polyisocyanates such as disclosed in U.S. Pat. No. 3,215,652.

Especially preferred polyisocyanates for use in the present inventions are polymethylene polyphenylene polyisocyanates (MDI). As used herein MDI refers to polyisocyanates selected from diphenylmethane diisocyanate isomers, polyphenyl polymethylene polyisocyanates and derivatives thereof bearing at least two isocyanate groups. In addition to the isocyanate groups, such compounds may also contain carbodiimide groups, uretonimine groups, isocyanurate groups, urethane groups, allophanate groups, urea groups or biuret groups. MDI is obtainable by condensing aniline with formaldehyde, followed by phosgenation, which process yields what is called crude MDI. By fractionation of crude MDI, polymeric and pure MDI can be obtained. The crude, polymeric or pure MDI can be reacted with polyols or polyamines to yield modified MDI. The MDI advantageously has an average of from 2 to 3.5, and preferably from 2 to 3.2 isocyanate groups per molecule. Especially preferred are methylene-bridged polyphenyl polyisocyanates and mixtures thereof with crude diphenylmethane diisocyanate, due to their ability to cross-link the polyurethane.

The total amount of polyisocyanate used to prepare the polyurethane foam should be sufficient to provide an isocyanate reaction index of typically from 25 to 300. Preferably the index is greater than 30. More preferred is an index greater than 35. Preferably the index is no greater than 100. More preferred is an index no greater than 90. Most preferred is an index no greater than 80. An isocyanate reaction index of 100 corresponds to one isocyanate group per isocyanate reactive hydrogen atom present from the water and the polyol composition.

Polyols which are useful in the preparation of the polyisocyanate-based cellular polymers include those materials having two or more groups containing an active hydrogen atom capable of undergoing reaction with an isocyanate. Preferred among such compounds are materials having at least two hydroxyl, primary or secondary amine, carboxylic acid, or thiol groups per molecule. Compounds having at least two hydroxyl groups per molecule, are especially preferred due to their desirable reactivity with polyisocyanates. Typically polyols suitable for preparing rigid polyurethanes include those having an average molecular weight of 100 to 10,000 and preferably 200 to 7,000. Such polyols also advantageously have a functionality of at least 2, preferably 3, and up to 8 active hydrogen atoms per molecule. For the production of semi-rigid foams, it is preferred to use a trifunctional polyol with a hydroxyl number of 30 to 300. Representative of polyols include polyether polyols, polyester polyols, polyhydroxy-terminated acetal resins, hydroxyl-terminated amines and polyamines. Examples of these and other suitable isocyanate-reactive materials are described more fully in U.S. Pat. No. 4,394,491. Preferred are polyols prepared by adding an alkylene oxide, such as ethylene oxide, propylene oxide, butylene oxide or a combination thereof, to an initiator having from 2 to 8, preferably 3 to 6 active hydrogen atoms.

In a preferred embodiment, the polyol is a mixture of polyether or polyester polyols used to prepare "flexible" foams and polyols used to prepare "rigid" foams. The flexible polyols generally have a hydroxyl number of 25 to 75 and a functionality of 2 to 3. The polyols used for rigid foams generally have a hydroxyl number of 150 to 800 and a functionality of 2 to 8. When such a blend is used, the blend has an average molecular weight and average functionality as described above.

It is preferred that the blowing agent consists essentially of water as the substantially sole blowing agent. The water reacts with isocyanate in the reaction mixture to form carbon dioxide gas, thus blowing the foam formulation. The amount of water added is generally in the range of 5 to 25 parts by weight per 100 parts by weight of polyol. Preferably water is added in the range of 10 to 20 parts, and more preferably from 14 to 18 parts per 100 parts of polyol.

If necessary, a volatile liquid such as a halogenated hydrocarbon or a low-boiling hydrocarbon (boiling point of −10° C. to +70° C. at normal pressure), such as pentane and/or isomers thereof or isobutane and/or isomers thereof may be used as a supplemental blowing agent. Although not preferred, a halocarbon may be used as a supplemental blowing agent. Halocarbons include fully and partially halogenated aliphatic hydrocarbons such as fluorocarbons, chlorocarbons, and chlorofluorocarbons. Examples of fluorocarbons include methyl fluoride, perfluoromethane, ethyl fluoride, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane.

Partially halogenated chlorocarbons and chlorofluorocarbons for use in this invention include methyl chloride, methylene chloride, ethyl chloride, 1,1,1-trichloroethane, 1,1-dichloro-1-fluoroethane (FCFC-141b), 1-chloro-1,1-difluoroethane (HCFC-142b), 1,1-dichloro-2,2,2-trifluoroethane (HCHC-123) and 1-chloro-1,2,2,2-tetrafluoroethane (HCFC-124).

Fully halogenated chlorofluorocarbons include trichloromonofluoromethane (CFC-11) dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane.

In addition to the foregoing critical components, it is often desirable to employ certain other ingredients in preparing cellular polymers. Among these additional ingredients are catalysts, surfactants, preservatives, colorants, antioxidants, reinforcing agents, stabilizers and fillers. In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 5 parts of the surfactant per 100 parts by weight polyol are sufficient for this purpose.

One or more catalysts for the reaction of the polyol (and water, if present) with the polyisocyanate are advantageously used. Any suitable urethane catalyst may be used, including tertiary amine compounds and organometallic compounds. Exemplary tertiary amine compounds include triethylenediamine, N-methylmorpholine, N,N-dimethylcyclohexylamine, pentamethyidiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N', N'-dimethyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation. Typical amounts are 0.001 to 2 parts of catalyst per 100 parts by weight of polyol.

Alternatively, other flame-retardant ingredients, known per se, may be used in addition to the graphite. Examples of such ingredients include halogen and/or phosphorous-containing compounds, antimony oxides, boron-containing compounds, hydrated aluminas or polyammonium phosphates. When present, the supplemental flame retardant is preferably a phosphonate or phosphate ester. Generally, when present the supplemental flame retardant will be added in an amount from 5 to 20 weight percent of the final foam. The addition of a supplemental flame retardant will influence the amount of graphite which must be added to meet the B2 flame test.

In making a polyurethane foam, the polyol(s), polyisocyanate and other components, including exfoliating graphite are contacted, thoroughly mixed and permitted to expand and cure into a cellular polymer. It is often convenient, but not necessary, to preblend certain of the raw materials prior to reacting the polyisocyanate and active hydrogen-containing components. For example, it is often useful to blend the polyol(s), blowing agent, surfactants, catalysts and other components except for polyisocyanates, and then contact this mixture with the polyisocyanate. In a preferred embodiment, the exfoliating graphite is homogeneously dispersed in the polyol component. Alternatively, all components can be introduced individually to the mixing zone where the polyisocyanate and polyol(s) are contacted. In such a process, the dispersion of exfoliating graphite in polyol may be added as a concentrate in the polyol by a separate line into the mixing zone. It is also possible to pre-react all or a portion of the polyol(s), in the absence of water, with the polyisocyanate to form a prepolymer.

The semi-rigid foams produced according to the present invention are used in the domestic sector, for example providing sound absorption, as paneling elements and in the automobile industry, as structure-borne soundproofing materials and thermal insulation of walls and roofs.

The following examples are given to illustrate the invention and should not be interpreted as limiting it in anyway. Unless stated otherwise, all parts and percentages are given by weight.

EXAMPLES

A description of the raw materials used in the examples is as follows.

Niax Y-10762 is a silicone based surfactant available from OSI Specialties/Witco Corp.

VORANATE M229 is a polymeric isocyanate available from The Dow Chemical Company.

Martinal ON310 is an aluminum hydroxide based flame retardant available from Martinswerk GmbH.

Exfoliating graphite utilized in the examples was S15-PU120 obtained from Ajay Metachem, India.

Polyol A is a glycerin-initiated polyoxypropylene polyether polyol having an average hydroxyl number of 150 and an average molecular weight of 1100, available from The Dow Chemical Company.

Polyol B is a glycerin-initiated polyoxypropylene polyether polyol having an average hydroxyl number of 35 and an average molecular weight of 4900, available from The Dow Chemical Company.

Polyol C is an ethylenediamine-initiated polyoxyethylene/polyoxypropylene polyether polyol having an average hydroxyl number of 800 and an average molecular weight of 281, available from The Dow Chemical Company.

A base polyol blend was prepared by mixing the following, given in parts by weight: 33 polyol A; 33 polyol B; 3.5 polyol C; 0.6 PMDETA; 0.3DMCHA. To a beaker were added the base polyol, and various amounts of TCPP and graphite. Water and catalyst were then added to the above mixture and gently stirred. The isocyanate was then added and the mixture stirred for 10 seconds at 3000 rpm and then poured into a 50 by 35 by 15 cm open box. The foam was allowed to rise under free rise conditions. The characteristic of the foam produced with varying components is given in Table I. To pass the B2 flame test (German norm DIN-4102 Teil 1, Mai 1998, baustoffklasse B2), the flame must be less than 15 cm.

TABLE I

|  | Control | A* | B* | 1 | 2 | 3 | 4 |
|---|---|---|---|---|---|---|---|
| Polyol A | 33 | 33 | 33 | 33 | 33 | 33 | 33 |
| Polyol B | 33 | 33 | 33 | 33 | 33 | 33 | 33 |
| Polyol C | 3.5 | 3.5 | 3.5 | 3.5 | 3.5 | 3.5 | 3.5 |
| TCPP | 40 | 20 |  | 40 | 40 | 20 |  |
| Martinal ON310 |  |  | 60 |  |  |  |  |
| Graphite |  | 10.5 |  | 10.5 | 22 | 22 | 22 |
| Water | 16 | 16 | 16 | 16 | 16 | 16 | 16 |
| L620 | 1 | 1 | 1 | 1 | 1 | 1 | 1 |
| Y10762 | 1 | 1 | 1 | 1 | 1 | 1 | 1 |
| PMDETA | 0.6 | 0.6 | 0.6 | 0.6 | 0.6 | 0.6 | 0.6 |
| DMCHA | 0.3 | 0.3 | 0.3 | 0.3 | 0.3 | 0.3 | 0.3 |
| PBW | 128.4 | 118.9 | 188.4 | 138.9 | 150 | 130.4 | 110.4 |
| INDEX | 47 | 47 | 47 | 47 | 47 | 47 | 47 |
| M 229 | 123 | 123 | 123 | 123 | 123 | 123 | 123 |
| Density km/m$^3$ | 11–12 | 11–12 | 20–22 | 11–12 | 11–12 | 11–12 | 11–12 |
| B2 | 13 | 16 | 13 | 9 | 5 | 6 | 13 |

*not an example of the present invention.

TCPP is the flame retardant additive tris(1-chloro-2-propyl) phosphate, available from Albright and Wilson Ltd.

PMDETA a tertiary amine catalyst, available from Air Products and Chemical Inc.

DMCHA is JEFFCAT DMCHA, a N,N-dimethylcyclohexyl amine catalyst available from Huntsman Corporation.

Niax L620 is a silicon based surfactant available from OSI Specialties/Witco Corp.

The results show that the TCPP can be replaced by the graphite as the sole flame retardant additive to meet the B2 flame test. The results also show that the use of a aluminum hydroxide-based flame retardant will give a foam which passes the B2 test but does not have the desired low density.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A method for producing a flame-retardant open-celled semi-rigid polyurethane foam having an overall density of 10 to 20 kg/m$^3$ by reacting (a) a polyisocyanate and (b) a polyol having an average molecular weight of 100 to 10,000 and an average functionality of 2 to 8, in the presence of (c) an effective amount of an exfoliating graphite, (d) blowing agent and (e) optional additional auxiliary substances.

2. The method of claim 1 wherein the polyol is a polyether polyol.

3. The method of claim 1 wherein the polyol is a polyester polyol.

4. The method of any of the preceding claims wherein the blowing agent is water.

5. The method of claim 4 wherein the water is added in an amount of 5 to 25 parts by weight per 100 parts by weight of polyol.

6. The method of claim 1 wherein the blowing agent is a combination of water and a hydrocarbon having a boiling point of −10° C. to +70° C.

7. The method of claim 1 wherein the blowing agent is a combination of water and halocarbon.

8. The method of claim 6 or 7 wherein the exfoliating graphite is added in an amount of at least 2 percent by weight of the final foam.

9. The method of claim 1 wherein the polyisocyanate is polymethylene polyphenylene polyisocyanates or an isomer thereof.

10. The method of claim 1 wherein the optional additional auxiliary substances includes an additional flame-retardant.

11. A foam produced by the method of claim 1.

12. A foam produced by the method of claim 6.

13. A foam produced by the method of claim 7.

14. A foam produced by the method of claim 8.

* * * * *